June 23, 1942.   N. YOUNG   2,287,074
ATTACHMENT FOR SCREW MACHINES
Filed April 5, 1941   2 Sheets-Sheet 1

INVENTOR
NATHANIEL YOUNG
BY
ATTORNEY

Patented June 23, 1942

2,287,074

UNITED STATES PATENT OFFICE 2,287,074

ATTACHMENT FOR SCREW MACHINES

Nathaniel Young, Kittery, Maine

Application April 5, 1941, Serial No. 387,015

1 Claim. (Cl. 29—57)

(Granted under the act of March 3, 1883, as amended April 30, 1928; 370 O. G. 757)

This invention relates to attachments for automatic screw machines and turret lathes for chasing threads, and it has for its principal object the provision of a device of the character described which is inexpensive to build and which will cut short accurate threads much more rapidly than any standard equipment heretofore employed for this purpose.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claim.

In order to make the invention more clearly understood, there are shown in the accompanying drawings, means for carrying the invention into practical use, without limiting the improvements in their useful application to the particular construction, which, for the purpose of explanation, have been made the subject of illustration.

Figure 1:
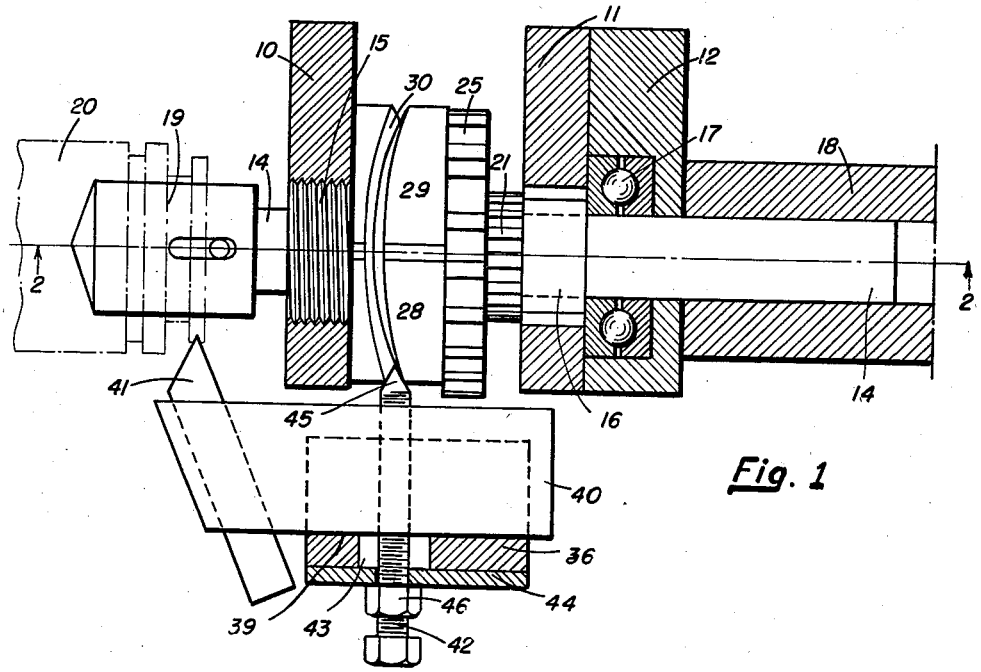
Fig. 1 is a horizontal sectional view through a screw attachment constructed in accordance with the invention and taken on line 1—1 of Fig. 2.
Figure 2:
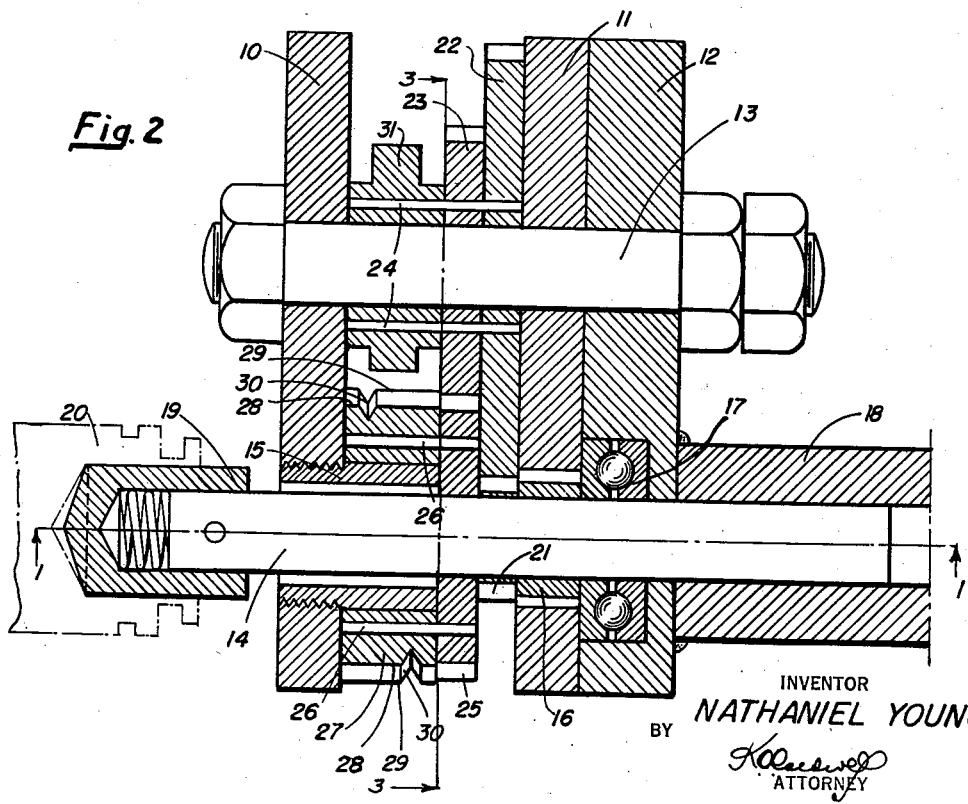
Fig. 2 is a vertical longitudinal sectional view taken one line 2—2 of Fig. 1.

Referring to the drawings, a screw thread cutting device embodying the present invention is shown as comprising spaced frame members 10 and 11 adapted to be quickly secured to a portion 12 of the frame structure of an automatic screw machine or turret lathe by means of a bolt 13 which also functions as a stud shaft in a manner to be described. A shaft 14 extends through a tubular nipple 15 threaded into the frame member 10 and is journalled at its inner end in a bushing 16 in the frame member 11 and a bearing 17 and tubular extension 18 carried by the frame structure 12 of the screw machine. The outer end of the shaft 14 is connected by means of an adapter 19 to the stock 20 to be threaded, as indicated by broken lines in Figs. 1 and 2, and from which power for operating the attachment is derived. A pinion 21 is fixed to the shaft 14 intermediate its length and meshes with and drives a gear 22 which is rotatably journalled on the bolt or shaft 13. A gear 23 of smaller pitch diameter is secured to the face of the gear 22 by means of pins 24 for intermeshing engagement with a gear 25 of corresponding diameter mounted on the shaft 14 for rotation independently thereof, the ratio of the gearing thus described being, in the present instance, four to one reduction.

Mounted for rotation on the nipple 15 and fixed to the face of the gear 25 by means of pins 26 is a cam 27 having a low portion 28 and a high portion 29 and having a continuous peripheral cam groove 30 formed thereon.

Fixed to the face of the gear 23 by means of the pins 24 and rotatably mounted on the stud shaft 13 is another cam 31 having a low portion 32 and a high portion 33, the high and low portions of the cams 27 and 31 being substantially each 180° in extent. A bell crank lever 34 having a horizontal arm 35 and a depending arm 36 is pivotally mounted by means of a pin 37 on an ear 38 formed on the frame element 10. The depending arm 36 is formed with a V-shaped transverse track 39 in which a tool holder 40 carrying a thread cutting tool 41 (Fig. 1) is slidably mounted, the latter being held from displacement therefrom by an adjusting screw 42. This screw passes through a slot 43 in the arm 36 and a guide plate 44 and is threaded into the tool holder 40 for horizontal adjustment and is provided with a pointed inner end 45 for engagement with the cam groove 30 in the cam 27. The screw 42 is locked in its adjusted position, although not tightly enough to prevent the holder 40 from sliding freely in its track 39, by means of a lock nut 46 threaded thereon for engagement with the guide plate 44. The horizontal arm 35 of the lever 34 carries a follower 47 which is secured to the arm by a bolt 48 and lock nut 49 and which engages the cam 31.

Figure 3:
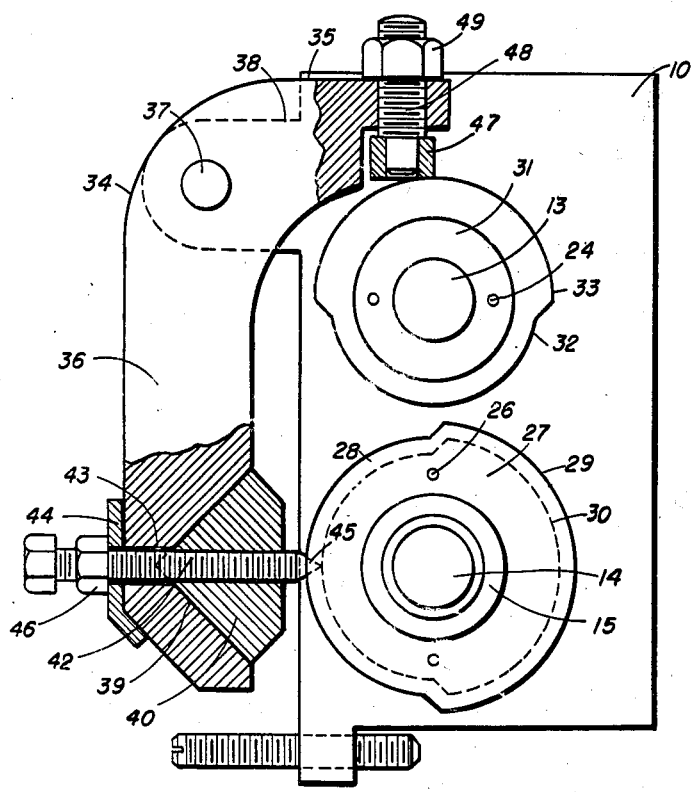
Fig. 3 is a vertical transverse sectional view taken on line 3—3 of Fig. 2.
Figure 4:
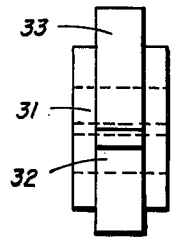
Fig. 4 is a front elevational view of the cams shown in Fig. 3.
Figure 4:
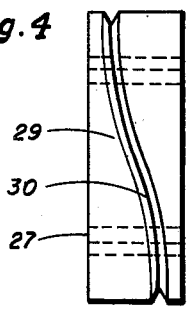

It will be noted from an inspection of Fig. 3 that the high part 33 of the cam 31 and the low part 28 of the cam 27 are angularly offset 45° relative to one another so that as long as the former is in engagement with the follower 47 the lever 34 is prevented from swinging about its pivot 37 and disengaging the pointed end 45 of the screw 42 from the portion of the cam groove 30 in the latter. The cams 27 and 31 rotate in unison at the same peripheral speed, owing to the fact that the intermeshing gears 23 and 25 which drive these cams are of the same pitch diameter. Also, the pitch and length of the portion of the cam groove 30 in the cam 15 is such as to cause the tool holder 40 and tool 41 carried thereby to travel linearly at the proper speed with reference to the speed of rotation of the work 20 so as to cut a thread therein of the desired pitch and length. The pitch of the thread is determined by the curvature of the cam groove 30 in the low part 28 of the cam 27 and the length of the threaded portion of the work 20 is determined by the length of this portion of the cam groove or the ratio of the gears 21 and 22.

As soon as the low portion 28 of the cam 27 reaches the pointed end 45 of the screw 42 the high portion 33 of the cam 31 moves out of contact with the follower 47 so that when the high portion 29 of the cam 27 contacts the screw 42 the lever 34 is free to be swung about its pivot 37 in a clockwise direction and lift the tool 41 clear of the thread. This permits the reverse curvature of the cam groove 30 in the high portion 29 of cam 27 to return the tool holder 40 and tool 41 back to their initial positions. As soon as this occurs the low portion 28 of the cam 27 again contacts the screw 42 and lowers the tool into engagement with the work for another cut.

The high portion 33 of the cam 31 now engages the follower 47 and locks the lever 34 and parts carried thereby in cutting position. The above described operations are repeated until a finished thread is obtained.

It will be understood that the above description and accompanying drawings comprehend only the general and preferred embodiment of the invention, and that various changes in construction, proportion and arrangement of the parts may be made within the scope of the appended claim without sacrificing any of the advantages of the invention.

The invention described herein may be manufactured and used by or for the Government of the United States of America for governmental purposes without the payment of any royalties thereon or therefor.

I claim:

A thread cutting attachment for screw machines comprising a frame; a lever pivotally mounted on said frame; a tool holder mounted for reciprocation on said lever; a lead cam rotatable by the stock being threaded, said lead cam having a portion for moving said holder and tool carried thereby on said lever and along the stock being threaded through a cutting stroke, a portion for moving said holder through a return stroke and a portion for swinging said lever about its pivot to hold said tool out of engagement with the stock during its return stroke; and a locking cam having a portion engageable with said lever for holding said lever against swinging movement about its pivot during the cutting stroke of said tool and a portion for releasing said lever to permit it to be swung to a position in which said tool is out of engagement with the stock during said return stroke.

NATHANIEL YOUNG.